2,780,514

METHOD OF RECOVERING URANIUM FROM AQUEOUS SOLUTIONS

Garson A. Lutz, Columbus, Ohio, assignor to the United States of America as represented by the United States Atomic Energy Commission No Drawing. Application March 21, 1952, Serial No. 277,899

2 Claims. (Cl. 23—14.5)

This invention deals with a method of recovering uranium values contained in aqueous solutions and in particular in alkali carbonate solutions.

Many uranium-containing ores, for the purpose of processing them, are first treated with an alkali carbonate, preferably sodium carbonate, and leached therewith prior to separating the various components. Monazite sand and shale, for instance, are ores which are usually treated with sodium carbonate solutions. The uranium content of these ores is mostly very low so that the solutions obtained by leaching are very dilute with regard to the uranium content. In the processes previously used for recovering uranium from such solutions a concentration step was therefore necessary prior to processing proper.

It is an object of this invention to provide a process for the recovery of uranium values from aqueous alkali carbonate solutions in which the uranium may be present in very low concentrations.

It is another object of this invention to provide a process for the recovery of uranium values from aqueous alkali carbonate solutions wherein a preliminary concentration step is not necessary prior to the uranium recovery proper.

It is still another object of this invention to provide a process for the recovery of uranium values from aqueous alkali carbonate solutions in which the uranium-containing solutions remain unchanged, apart from the removal of the uranium, so that the uranium-depleted solutions are immediately reusable for further leaching.

It is finally also an object of this invention to provide a process for converting dilute uranium solutions into solutions of considerably higher concentrations.

These and other objects are accomplished by contacting a uranium-containing alkali carbonate solution with a strong-base quaternary amine anion exchange resin whereby the uranium is adsorbed on said resin and the solution is depleted of the uranium, and separating the uranium-containing resin from the uranium-depleted solution.

The concentration of the solutions from which the uranium is to be recovered may vary widely. Concentrations between 1 and 20% of sodium carbonate have been found suitable; however, a sodium carbonate content of from 5 to 10% is preferred.

All strong-base quaternary amine anion exchange resins are satisfactory for the process of this invention. A resin which has given especially good results is that sold under the trademark Amberlite IRA–400. Amberlite IRA–400 is a strongly basic anion exchange resin prepared according to Example I of U. S. Patent No. 2,578,937, granted to Robert Kunin and Francis X. McGarvey on December 18, 1951.

Prior to using the resin it is advisable to subject it to a preconditioning process. This process preferably comprises air-drying at room temperature whereby the water content of the resin is reduced to about 10%, followed by washing with a sodium hydroxide solution of a concentration of approximately 1 N. From 10 to 20 ml. of such a solution for each gram of resin have been found satisfactory. After the treatment with sodium hydroxide it is advisable to wash the resin with water until the effluent or supernatant is neutral.

The adsorption may be carried out as a discontinuous batch process or in a continuous or semi-continuous column operation; the latter is preferable. If adsorption is carried out in a container as a batch process, agitation for about 30 minutes is helpful.

Experiments proved that the presence of aluminum and phosphate ions does not impair the adsorption.

For recovering the uranium values that have been adsorbed on the resin, an eluant is passed over, or contacted with, the resin. Mineral acids, preferably in a concentration between 3 and 6%, have been found suitable. Another very satisfactory eluant is a 6% solution of sodium hydroxide which contains approximately 0.3% hydrogen peroxide.

In the following a few examples are given to show the efficiency of the process of this invention; it is not intended, however, to have the invention limited to the details given in these examples.

Example I

An aqueous solution containing 5% sodium carbonate and 100 mg. of uranium per liter was agitated for 30 minutes with 5 grams of Amberlite IRA–400. The aqueous solution was then separated from the resin and analyzed. From the results of the analysis it was found that 80% of the uranium originally present in the solution had been adsorbed by the resin.

The experiment was repeated, but 10 grams of resin instead of 5 grams were used; in this instance a uranium recovery of 94% was accomplished.

Repetition of these two experiments with Dowex A–1 and Dowex A–2 gave roughly the same satisfactory results.

Example II

Ten liters of a solution containing 10% sodium carbonate and 100 mg. of uranium per liter were contacted with 50 grams of Amberlite IRA–400 which was arranged in a column 2 x 45 cm. The resin had been preconditioned by air-drying and washing with 500 ml. of a 4% sodium hydroxide solution. The flow rate of the uranium-containing sodium carbonate solution through the resin was 500 ml./hr. An adsorption of 100% of the uranium was obtained. When another 5 liters under the same conditions were guided through the resin, the overall adsorption amounted to 93%.

This experiment was repeated with the only distinctions that 200 grams of Amberlite were used in a column of the dimensions 3.5 x 46.5 cm. and that the flow rate was 1200 ml./hr. In this instance the adsorption efficiency was 100% even after 19 liters of the solution had passed through the resin; however, when 38 liters of the solution had been treated, the percentage of adsorption had dropped to 60%; this reduced the over-all uranium recovery, at 38 liters, to 87%.

Example III

Fifteen liters of a solution containing 100 mg. of uranium per liter were passed through 50 grams of Amberlite IRA–400, whereby 1400 mg. of uranium were adsorbed; this corresponds to a uranium removal of 93%. This resin was then treated, for elution of uranium, with hydrochloric acid of a concentration of 3.6%, and the effluent was collected in 250-ml. fractions. The first fraction contained 500 mg. of uranium which corresponds to 36% of the quantity that had been adsorbed on the resin. The second fraction contained 675 mg. or 48% of uranium.

Thus, a total of 78% of the uranium originally contained in 15 liters of solution was now dissolved in as small a volume as 500 ml. This clearly shows the high degree of concentration that can be obtained by the process of this invention.

It was found that solutions containing uranium in concentrations as low as 20 p. p. m. can be treated successfully by the process of this invention. This is an essential advantage over other methods previously used in which a concentrating step had to be inserted prior to the recovery proper.

It will be understood that this invention is not to be limited to the details given herein but that it may be modified within the scope of the appended claims.

What is claimed is:

1. A process of recovering uranium values from an aqueous alkali carbonate solution, comprising contacting said solution with a strong-base quaternary amine anion exchange resin in its basic form whereby the uranium values are adsorbed on said resin, separating the uranium-containing resin from the uranium-depleted solution, and eluting the uranium values from the resin with an aqueous medium consisting of a mixture of sodium hydroxide and hydrogen peroxide.

2. The process of claim 1 wherein the aqueous medium is a solution containing 6% of sodium hydroxide and about 0.3% of hydrogen peroxide.

References Cited in the file of this patent

UNITED STATES PATENTS 1,065,581   Bleecker _____ June 24, 1913

FOREIGN PATENTS 626,882   Great Britain _____ July 22, 1949

OTHER REFERENCES

Mellor, Comprehensive Treatise of Inorganic and Theoretical Chemistry, vol. 12, page 116 (1932), published by Longmans, Green and Co., London.

Bachelet et al.: Bulletin de la Societe Chimique de France, January–February 1952, pages 55–60.